(12) United States Patent
Peacos, III et al.

(10) Patent No.: US 9,855,544 B2
(45) Date of Patent: Jan. 2, 2018

(54) CANISTER SYSTEM FOR AIR SEPARATION MODULE

(71) Applicant: Hamilton Sundstrand Corporation, Windsor Locks, CT (US)

(72) Inventors: Frederick Peacos, III, North Scituate, RI (US); Corey E. Rekow, West Hartford, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 360 days.

(21) Appl. No.: 14/587,265

(22) Filed: Dec. 31, 2014

(65) Prior Publication Data

US 2016/0184793 A1    Jun. 30, 2016

(51) Int. Cl.
*B01J 19/24*    (2006.01)
*B64D 37/32*    (2006.01)
*B64D 13/06*    (2006.01)

(52) U.S. Cl.
CPC .............. *B01J 19/24* (2013.01); *B64D 37/32* (2013.01); *B01J 2219/00245* (2013.01); *B01J 2219/24* (2013.01); *B64D 2013/0677* (2013.01)

(58) Field of Classification Search
CPC .................... B01J 19/24; B01J 2219/24; B01J 2219/00245; B65D 37/32; B64D 2013/0677
See application file for complete search history.

(56) References Cited

U.S. PATENT DOCUMENTS

| | | | |
|---|---|---|---|
| 4,488,889 A | 12/1984 | McCarroll | |
| 4,838,901 A | 6/1989 | Schmidt et al. | |
| 5,013,331 A * | 5/1991 | Edwards | B01D 53/22 95/22 |
| 2004/0065778 A1 | 4/2004 | Jones | |
| 2010/0024649 A1 | 2/2010 | Semmere et al. | |

FOREIGN PATENT DOCUMENTS

WO    0067885 A1    11/2000

OTHER PUBLICATIONS

International Search Report, International Application No./Patent No. 152032405-1754, dated May 4, 2016, European Patent Office; International Search Report 7 pages.

* cited by examiner

*Primary Examiner* — Timothy Cleveland
(74) *Attorney, Agent, or Firm* — Cantor Colburn LLP

(57) ABSTRACT

An air separation module including a canister defining an interior chamber and having a first port at a first end and a second port at a second end, the canister configured to permit fluid to pass from the first port to the second port through the interior chamber, a first end cap located proximal to the first end of the canister and configured to releasably retain the first end of the canister, a second end cap located proximal to the second end of the canister and configured to releasably retain the second end of the canister, and a collar movably configured on the second end of the canister and configured to move from a first position to a second position, wherein the first position defines an engagement between the collar and the second end cap, and the second position defines a disengagement between the collar and the second end cap.

8 Claims, 7 Drawing Sheets

CANISTER SYSTEM FOR AIR SEPARATION MODULE

BACKGROUND OF THE INVENTION

The subject matter disclosed herein generally relates to the field of air separation canister systems, and more particularly to installation and removal apparatus and methods for air separation canister systems.

Air separation systems on aircraft utilize the pressure differential between air inside of the aircraft and air outside of the aircraft to separate air, such as cabin air or bleed air, into a first fraction that is slightly enriched with oxygen and a second fraction that is highly enriched with nitrogen. The nitrogen rich air is supplied to the fuel tanks of the aircraft and used to provide an inert atmosphere inside the fuel tanks as fuel is consumed.

Traditional air separation modules include canisters that are mounted within a frame assembly and the frame assembly is mounted into an aircraft. One or more canisters may be integrally connected with the frame assembly. To remove and/or change a canister that is part of one of these systems, the entire frame assembly must be removed from the aircraft. As the frame assemblies, with integral canisters, are heavy and bulky, the process for removing and/or changing the canisters may be difficult and/or time consuming.

BRIEF DESCRIPTION OF THE INVENTION

According to one embodiment, an air separation module is provided. The module includes a canister defining an interior chamber and having a first port at a first end and a second port at a second end. The canister is configured to permit fluid to pass from the first port to the second port through the interior chamber. A first end cap is located proximal to the first end of the canister and configured to releasably retain the first end of the canister, the first end cap defining a fluid path therethrough. A second end cap is located proximal to the second end of the canister and configured to releasably retain the second end of the canister, the second end cap defining a fluid path therethrough. A collar is movably configured on the second end of the canister and configured to move from a first position to a second position, wherein the first position defines an engagement between the collar and the second end cap, and the second position defines a disengagement between the collar and the second end cap such that the canister may be removed from retention between the first and second end caps.

According to another embodiment, a method of removing and installing an air separation module canister in an air separation module is provided. The method includes engaging a first end of a canister to a first end cap, engaging a second end of the canister to a second end cap, the second end of the canister including a collar defining a first position and a second position, moving the collar on the second end of the canister from the second position to the first position to engage the collar with the second end cap, and locking the canister in an engaged position with a locking mechanism between the first end cap and the second end cap.

Technical features of the invention include an elegant canister system in air separation modules of aircraft, including a removable canister that is not part of a frame assembly. Further technical features of the invention include providing a removable engagement mechanism between a canister and other component parts of an air separation module to provide ease of installation and removal of the canisters.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1A:
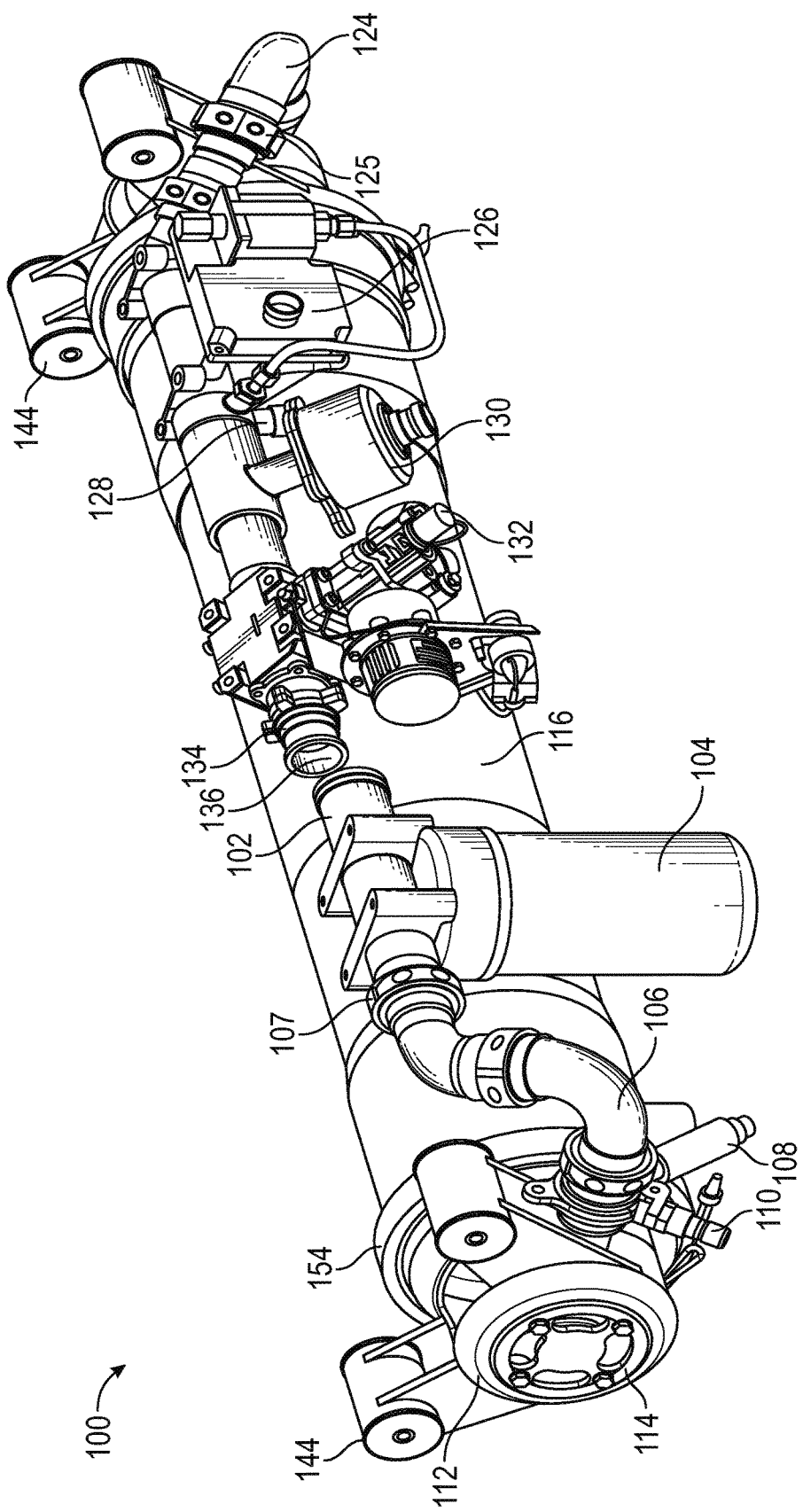
FIG. 1A is a schematic view of an air separation module in accordance with an exemplary embodiment of the invention.
Figure 1B:
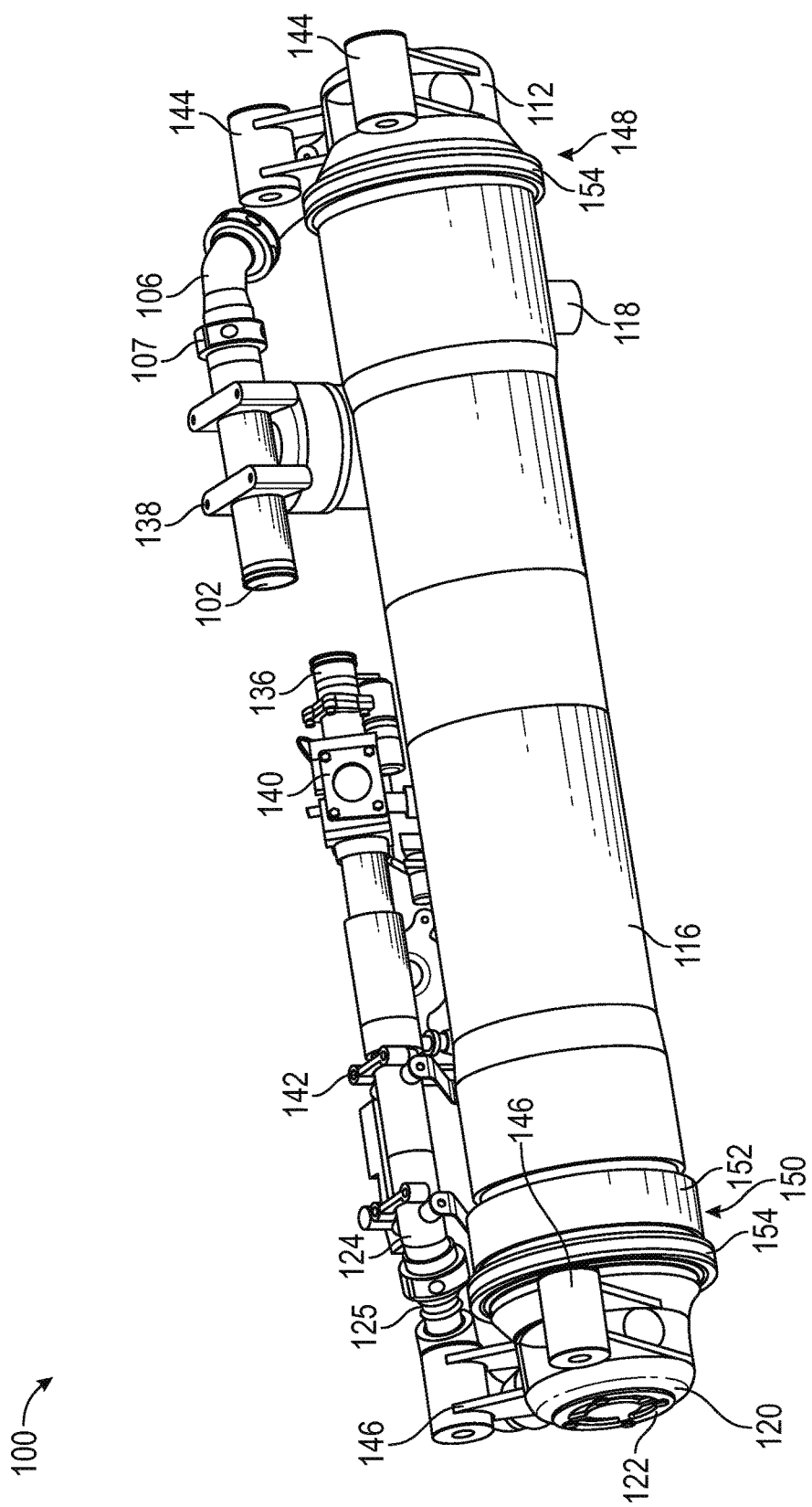
FIG. 1B is an alternate view of the air separation module of FIG. 1A.

FIG. 1A is a schematic view of an air separation module 100 in accordance with an exemplary embodiment of the invention and FIG. 1B shows an alternate view of the same air separation module 100. Bleed air enters the air separation module 100 at bleed air inlet 102 and passes through an ozone converter/filter 104. The air then passes through first end piping or ducting 106 including flexible joints 107 and a number of sensors, including pressure sensor 108 and temperature sensor 110. The air then passes into a first end cap 112 that includes a first transfer tube 114, described below. The first end cap 112 is configured to be in fluid communication with a canister 116 and defines a fluid flow path from the first end ducting 106 to the canister 116.

Figure 2A:
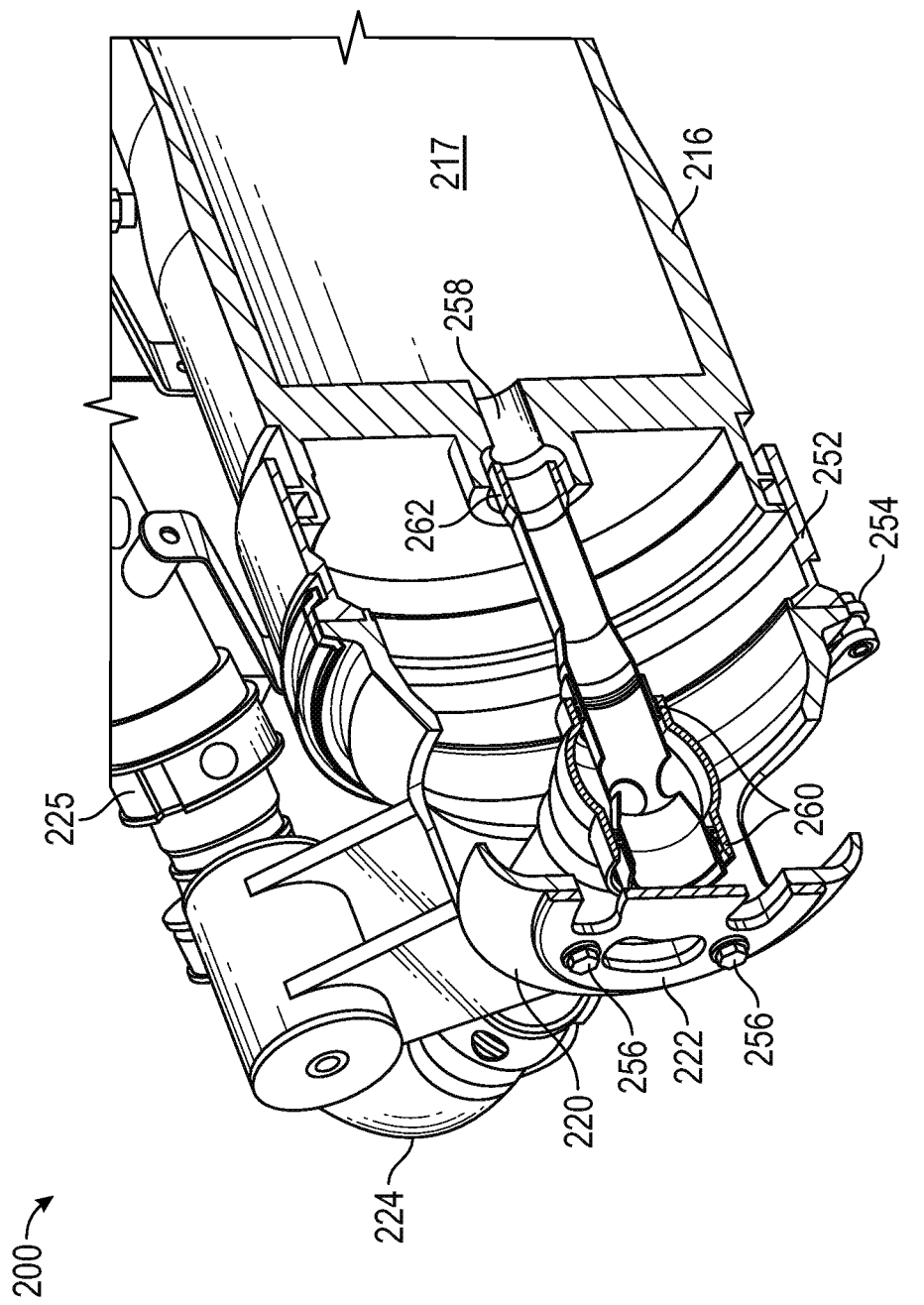
FIG. 2A is a cut-away schematic of an air separation module in accordance with an exemplary embodiment of the invention showing a transfer tube in a first position.
Figure 2B:
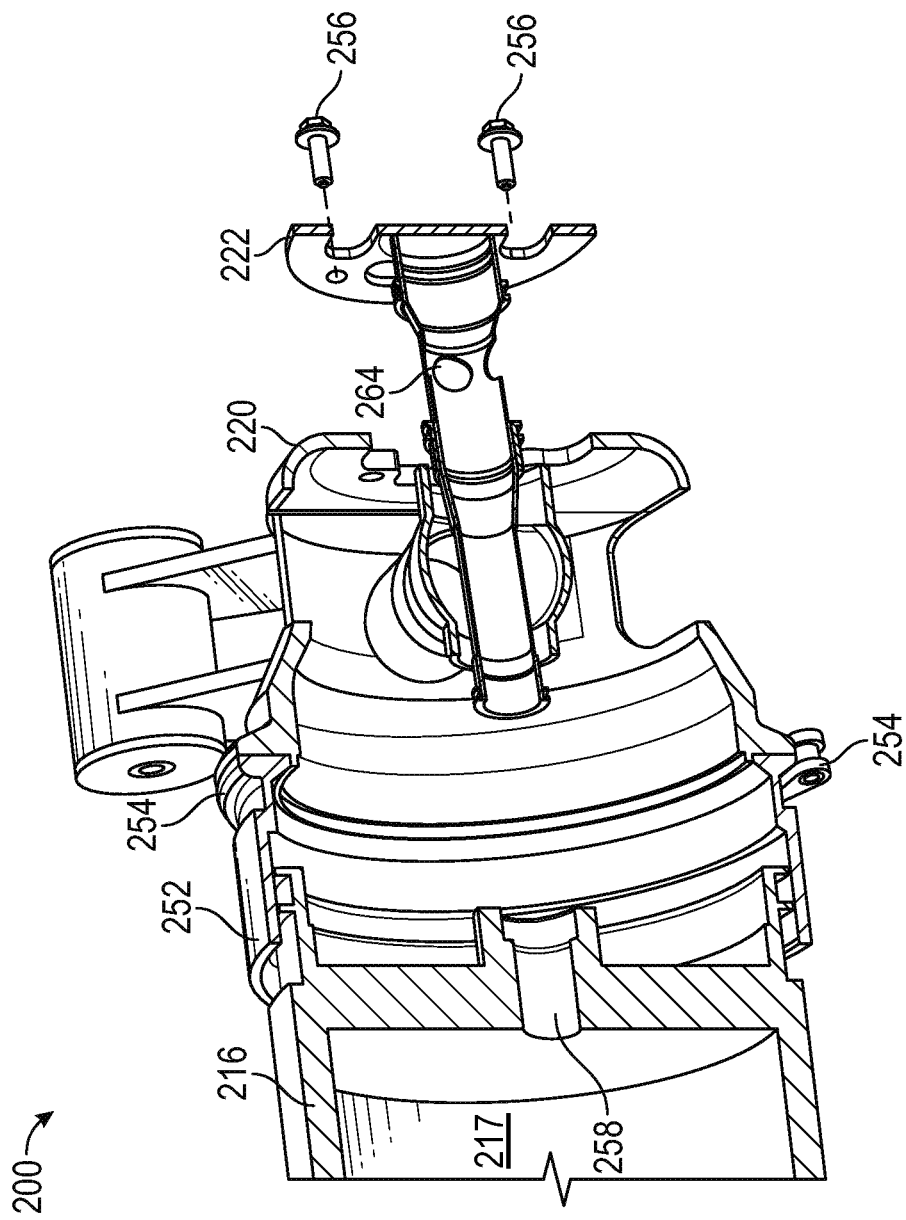
FIG. 2B is a cut-away schematic of the air separation module of FIG. 2A showing the transfer tube in a second position.

Thus, after passing through the end cap 112, the air flows into the air separation canister 116 which defines an interior chamber, shown in FIGS. 2A and 2B, that is configured to separate the air into component parts. For example, the air is separated into two fractions, a first fraction that is oxygen rich will exit the air separation module 100 at an overboard oxygen outlet 118 and a second fraction that is nitrogen rich passes out of the air separation module 100 at a second end cap 120 that defines a fluid flow path from the first canister 116 to second end piping or ducting 124.

The second end cap 120 includes a second transfer tube 122 and is substantially similar to first end cap 112 and first transfer tube 114. The nitrogen rich fraction will then flow through second end ducting 124 and flexible joints 125 and pass a number of sensors including an oxygen sensor 126, a temperature sensor 128, and a flow sensor 130. A flow control valve 132 is provided in the flow line prior to a check valve 134, which, in combination control, the flow of the separated nitrogen exiting the air separation module 100 at nitrogen outlet 136. The ducting 106, 124, filter 104, flexible joints 107, 125, inlet 102, sensors 108, 110, 126, 128, 130, valves 132, 134, and outlet 136 may be referred to as ducting elements or filter, valve, and duct assemblies. In general terms, the ducting elements are configured to supply and control the flow of bleed air to the air separation module 100, and configured to supply and control the flow of nitrogen rich air from the canister 116 to fuel tanks of an aircraft.

The air separation module 100 is configured to be mounted within an aircraft, and removably connect to various components of the aircraft, such as a flow line that will provide the nitrogen rich fraction to the fuel tanks to provide an inert gas thereto. The air separation module 100 is configured to be mounted to one or more brackets or other types of connectors or frames that are part of the aircraft. Accordingly, various fittings are provided on the components of air separation module 100 to enable mounting within an aircraft. For example, as shown in FIGS. 1A and 1B, air separation module 100 includes fittings or retaining members 138, 140, and 142, which are each part of the filter, valve, and duct assemblies that are separate from the canister 116. Although shown herein with three sets of retaining members 138, 140, and 142, those of skill in the art will appreciate that any number of retaining members may be used without departing from the scope of the invention. Further, as shown in FIGS. 1A and 1B, each retaining member 138, 140, and 142 includes four points of contact, however, those of skill in the art will appreciate that the number of points of contact may be varied without departing from the scope of the invention, and further the configuration of the contact points may be varied without departing from the scope of the invention.

Canister 116 is releasably retained between the first end cap 112 and the second end cap 120. First end cap 112 is mounted to a part of the aircraft by first structural attachment points 144, such as vibration isolators or other types of attachment means, and second end cap 120 is mounted to another part of the aircraft by second structural attachment points 146, such as vibration isolators. Thus, the first end cap 112, the second end cap 120, and the canister 116 retained therebetween form and/or add a structural component to the air separation module 100. At a first end 148, canister 116 removably engages or fits within or to a portion of the first end cap 112. At a second end 150, canister 116 removably engages or fits within or to a portion of the second end cap 120. As shown in FIG. 1B, canister 116 includes a collar 152 at the second end 150 which is configured to releasably engage with the second end cap 120. When installed, the first end 148 and the second end 150 of the canister 116 are releasably retained to the first end cap 112 and the second end cap 120, respectively, by use of locking mechanisms 154, such as V-band couplings, although other types of locking mechanisms, coupling devices, retaining devices, etc. may be used without departing from the scope of the invention. Further, although shown with two structural attachment points forming the first and second structural attachment points 144 and 146, those of skill in the art will appreciate that the number of structural attachment points may be varied without departing from the scope of the invention, and that the structural attachment points may be formed as vibration isolators or other types of attachment means, which may be rigid or permit movement of the end caps and canister.

Those of skill in the art will appreciate that variations of the configuration shown in FIGS. 1A and 1B may be possible without departing from the scope of the invention. Thus, these figures and explanations are presented merely for exemplary purposes and the invention is not limited thereby.

In FIGS. 2A and 2B, detailed cut-away views of an end cap, canister, and related features of an air separation module 200 in accordance with an exemplary embodiment of the invention are shown. Features in FIGS. 2A and 2B may be substantially similar to features of the air separation module 100 of FIGS. 1A and 1B, and thus like features have the same reference numeral except preceded with a "2" rather than a "1." FIGS. 2A and 2B show an end cap 220 removably connected to a canister 216 defining an interior chamber 217 by means of a collar 252 and a locking mechanism 254. FIGS. 2A and 2B further show the operation/configuration of a transfer tube 222 therein.

The transfer tube 222 is located and movably retained within the end cap 220. The transfer tube, when installed (FIG. 2A) is configured to convey air from ducting 224, which connects radially to end cap 220. The air flow then is routed approximately ninety degrees to flow axially into the chamber 217 of canister 216. The opposite flow is also possible, depending on the flow direction of the air.

The transfer tube 222 is releasably retained to end cap 220 by fasteners 256, which when engaged with the end cap 220 fixedly secure the transfer tube 222 into the end cap 220. FIG. 2A shows transfer tube 222 in a first position, and FIG. 2B shows transfer tube 222 in a second position. The first position may be an engaged position where transfer tube 222 completes the flow path of air separation module 200 by enabling a fluid to flow from canister 216, through the transfer tube 222, and into the ducting 224 (including joints 225). Those of skill in the art will appreciate that the opposite or reverse flow is possible depending on the fluid flow direction through the air separation module 200 and which end of the canister 216 the transfer tube 222 is installed.

The second position may be a disengaged position where the transfer tube 222 does not complete the above flow path. In some embodiments, in the second position the transfer tube 222 may be completely removed from the end cap 220. In such embodiments, for example, the transfer tube 222 may be retained with relatively short screws, bolts, or other types of fasteners 256.

In other embodiments, the transfer tube 222 may be movably retained to the end cap 220 but not removable therefrom. For example, the transfer tube 222 may be configured to be withdrawn axially a certain or predetermined distance such that it is not removed from the end cap 220. In such embodiments, the transfer tube 222 may be secured to the end cap 220 by one or more fasteners 256 that may be relatively long. To effect the axial disengagement of the transfer tube 222 from the end cap 220, each fastener 256 may be turned several rotations to back out a predetermined distance, and the transfer tube 222 may then be moveable the predetermined distance off of a surface of the end cap 220.

In other embodiments, to accommodate the fasteners 256, the transfer tube 222 may be configured with through-holes, with fasteners 256 that may be relatively short, although relatively long fasteners could be used without departing from the scope of the invention. In some such embodiments, the through-holes may be configured as a key-hole slot. The key-hole slot may be configured as an annular slot with an arc length that is at least twice the diameter of a head of the fastener 256. The width of the key-hole slot may be configured such that it is less than the diameter of the head of the fastener 256 at one end and at the other end of the arc length the slot width is larger than a diameter of the head of the fastener 256. In some embodiments, the transfer tube 222 may be configured as being largely axi-symmetric with no keying features and can be movably rotated when the fasteners 256 are loosened. When rotated and the fasteners 256 are concentric with the enlarged end of the slot of the key-hole, the transfer tube 222 can be disengaged from the canister 220 with no further removal of the fasteners 256 required. Upon reinserting the transfer tube 222 into the fully engaged position, the transfer tube 222 can be rotated back so that the heads of the fasteners 256 can be seated with maximum contact against the surface of the transfer tube 222. Further, in some embodiments, because the fasteners 256 may not require complete removal in order to disengage the transfer tube 222, the fasteners 256 may be fitted with retaining rings or similar features to preclude inadvertent removal.

When in the first, engaged position, the transfer tube 222 provides sealing engagement with both the end cap 220 and a port 258 of canister 216. Seals 260 provide sealing engagement between the transfer tube 222 and the end cap 220 and may be configured as O-rings or other types of seals known in the art. Further, seal 262 provides sealing engagement between the transfer tube 222 and the port 258 of canister 216.

As shown in FIGS. 2A and 2B, transfer tube 222 includes apertures 264 that enable a fluid flow through the ducting 224, through end cap 220, through transfer tube 222, through port 258, and into the canister 216. A similar configuration is provided at each end of the canister, such as that shown in FIGS. 1A and 1B, and thus the fluid flow path will be enabled to flow in the opposite direction at the opposite end of the air separation module 200.

Figure 3A:
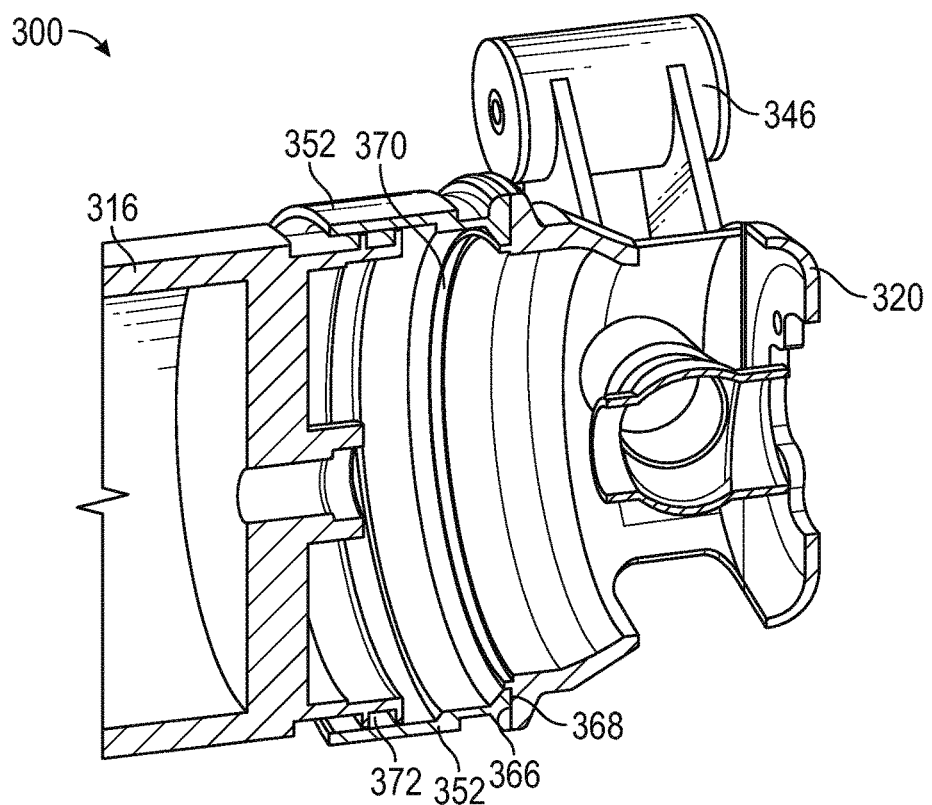
FIG. 3A is a cut-away schematic of an air separation module in accordance with an exemplary embodiment of the invention showing a collar in a first position.
Figure 3B:
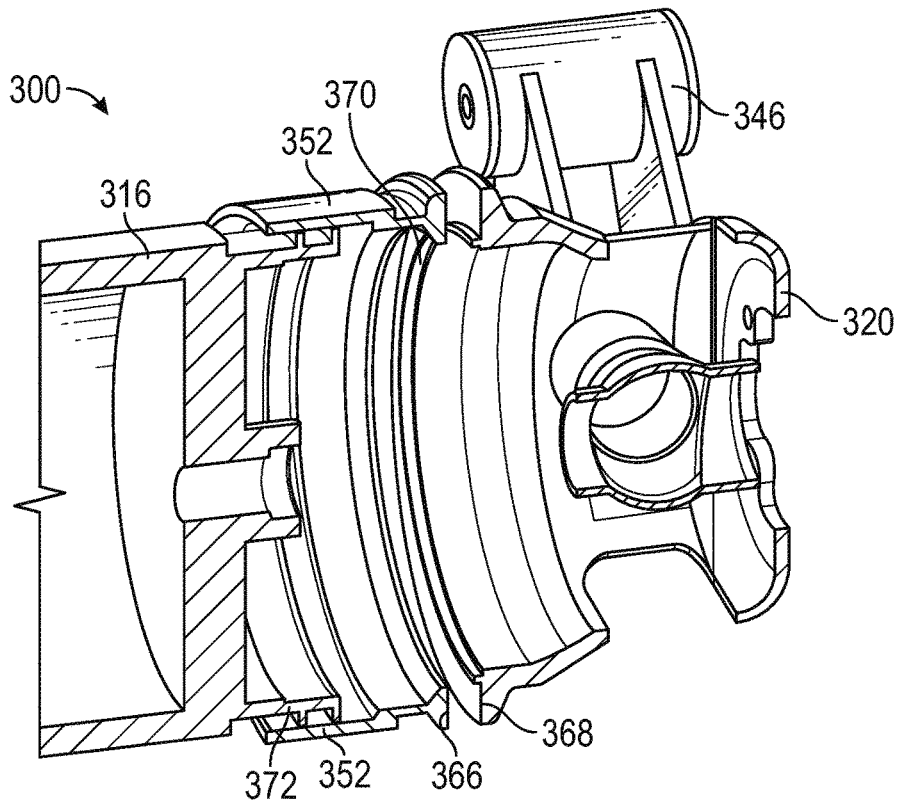
FIG. 3B is a cut-away schematic of the air separation module of FIG. 3A showing the collar in a second position.

Further, as shown in FIGS. 2A and 2B, the collar 252 is engaged with the end cap 220 and fixedly retained thereto with the locking mechanism 254. In FIGS. 3A and 3B, the operation of the collar in accordance with embodiments of the invention is shown. Features in FIGS. 3A and 3B may be substantially similar to features of the air separation modules 100 and 200 of FIGS. 1A, 1B and 2A, 2B, respectively, and thus like features will have the same reference numeral except preceded with a "3" rather than a "1" or a "2."

Air separation module 300 shows an end cap 320 engaged with a canister 316. In FIGS. 3A and 3B the transfer tube has been removed and is not shown. Although this is done for clarity and explanatory purposes, those of skill in the art will appreciate that transfer tube is not required to be fully removed from the end cap, such as with some of the embodiments described above.

In FIG. 3A, the canister 316 is in a first position and in FIG. 3B the canister 316 is in a second position. The first position may be an installed or engaged position and the second position may be a retracted or disengaged position. As shown, the collar 352 is configured as a slip joint that moves relative to the canister 316. In the first position (FIG. 3A), a collar joining surface 366 of the collar 352 engages with an end cap joining surface 368 to provide sealing engagement therebetween. Further, a pilot surface 370 of end cap 320 is configured to align and physically support the canister 316 in the engagement between the end cap 320 and the canister 316 providing, in part, the structural feature of the module systems disclosed herein. One or more sealing surfaces 372 are provided between the collar 352 and the canister 316. The one or more sealing surfaces 372 may be configured to accommodate one or more O-rings or similar sealing devices, which are not shown for clarity purposes, but will be readily appreciated by those of skill in the art.

Those of skill in the art will appreciate that other forms or engagement, retention, sealing, and support may be provided without departing from the scope of the invention. For example, the pilot surface 372 may be configured as a plurality of pegs, pins, etc., or may be configured as a flange or similar structure, further, a pilot surface may be provided on the canister instead of or in addition to the end cap.

As noted, the collar 352 is moveable with respect to the canister 316. When the collar 352 is in the second position (FIG. 3B), the canister 316 may be removed from or moved relative to the end cap 320, as will be discussed with respect to the embodiment shown in FIG. 4 and process of FIG. 5. Then, when the collar 352 is moved to the first position (FIG. 3A), the surface 366 engages with the surface 368 and a locking mechanism (see FIGS. 2A and 2B) can be engaged around the two surfaces to lock the canister 316 in place with respect to the end cap 320. The transfer tube, as discussed above, can then be inserted into the end cap 320 and fixedly attached thereto. The air separation module 300 is then ready to be used. Further, the reverse process may be carried out to remove the canister 316. For example, (i) the transfer tube may be removed, (ii) the locking mechanism released, and (iii) the collar 352 moved to the second position to enable easy release and removal of the canister 316 from the air separation module 300.

In some embodiments, the collar 352 may be freely moveable between the first and second positions. In other embodiments, the collar 352 may be biased toward one of the first position and the second position. Thus, in some embodiments the collar 352 may be configured with a spring or other similar biasing mechanism that will urge the collar toward the first position or toward the second position, as would be known in the art.

Figure 4:
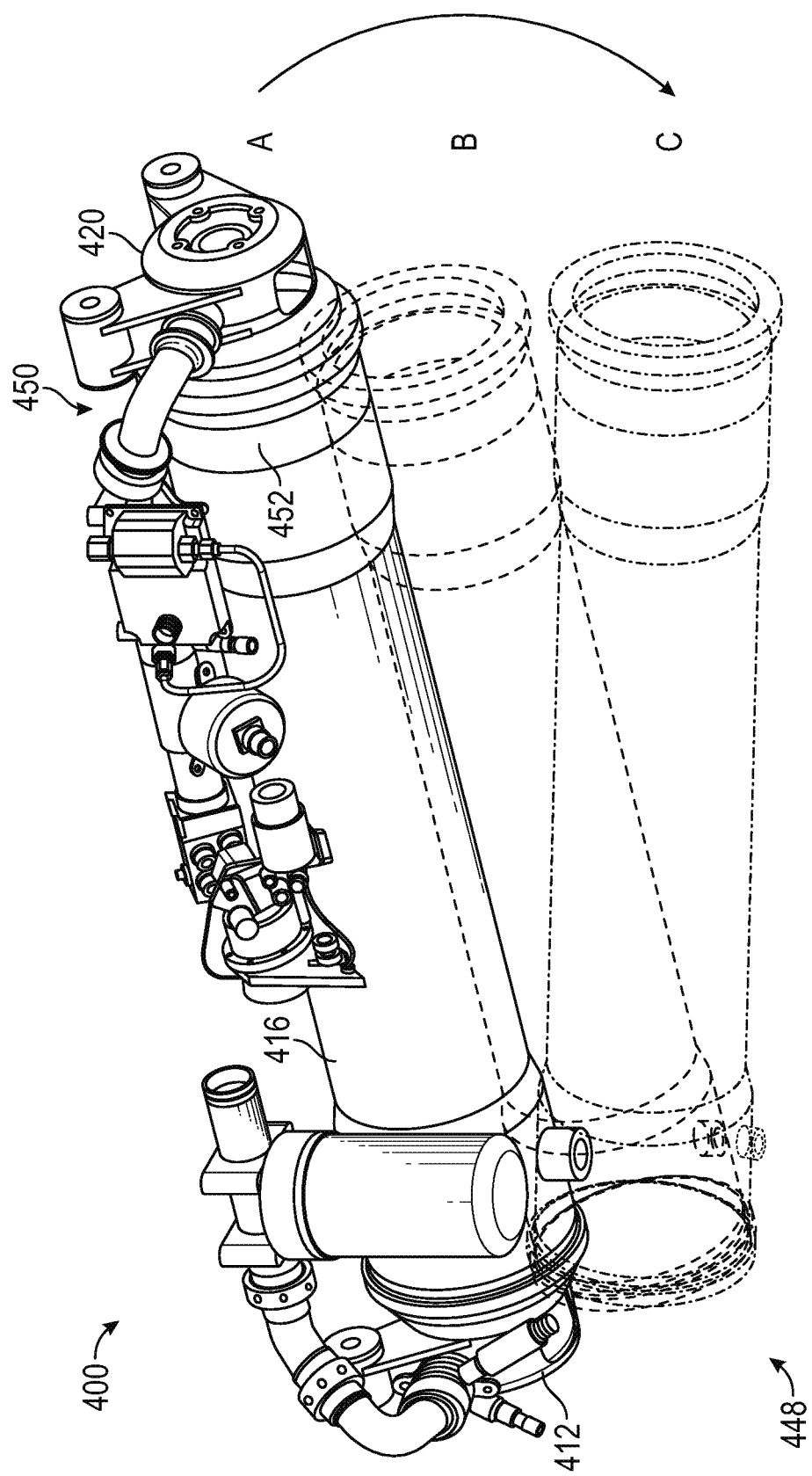
FIG. 4 is a schematic view of a removal or installation process in accordance with an exemplary embodiment of the invention.

In FIG. 4, a schematic showing the removal process of the canister 416 from the air separation module 400 is shown. The process of FIG. 4 (and the prior figures) will also be explained with reference to FIG. 5, which is an exemplary process of removing a canister from an air separation module in accordance with embodiments of the invention. Features in FIG. 4 may be substantially similar to features of the air separation modules discussed above and thus like features will have the same reference numerals except preceded with a "4" rather than a "1," "2," or "3."

In FIG. 4, the transfer tube is omitted for clarity, but it may be partly disengaged or completely removed, as described above. Referring to FIG. 2A, the transfer tube 222, when installed, may prevent the canister 216 from moving radially relative to the end cap 220. Thus, in FIG. 4, the removal or disengagement of the transfer tube has been removed, which enables the removal of the canister 416 from the air separation module 400. Thus, a first step 502 in process 500 entails disengaging and/or removing the transfer tube from the end cap 420 of module 400. Next, at step 504 the locking mechanism (also not shown in FIG. 4, as it has been removed) is removed from the engagement between the end cap 420 and the canister 416. Then, at step 506, the collar 452 is slid from the first, engaged position (FIG. 3A) to the second, disengaged position (FIG. 3B). At step 508, the canister may then be moved from an engaged position, shown as Position A of FIG. 4, to a release position, shown as Position B of FIG. 4. In the release position B, a first end 448 may stay engaged or at least partially held or retained by a first end cap 412. However, in the release position B, the second end 450 of the canister 416 is released from and not engaged with the second end cap 420. After the release position B is obtained, the canister 416 can then be removed from the first end cap 412 and be moved to a removed position C at step 510, shown in FIG. 4. Thus the canister 416 may be fully removed from the air separation module 400 while the other components may remain attached to the aircraft.

Figure 5:
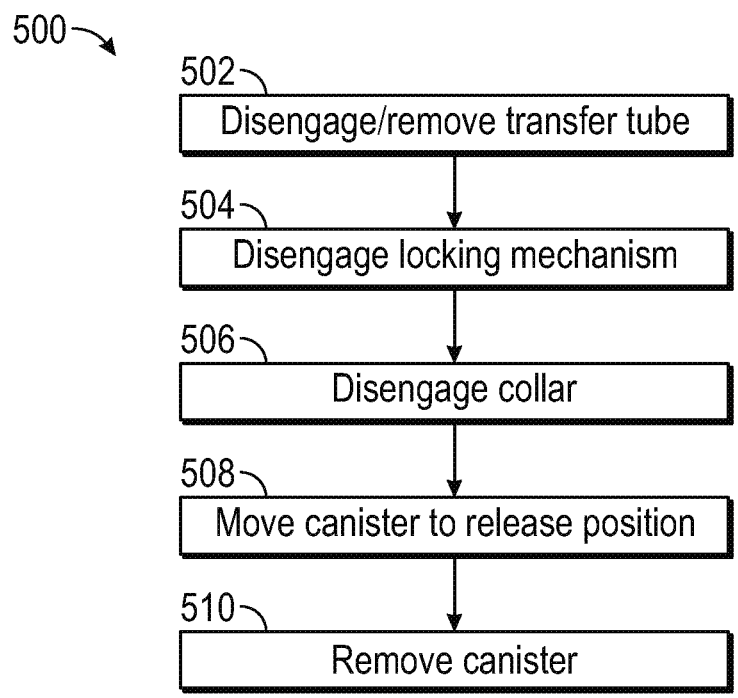
FIG. 5 is a process flow of removing a canister from an air separation module in accordance with an embodiment of the invention.

Those of skill in the art will appreciate that to install a canister within an air separation module as disclosed herein, the reverse process of FIGS. 4 and 5 may be performed. Thus, (i) a canister may be engaged at a first end (in the release position B), (ii) a second end moved upward into the engaged position A, (iii) a collar slid from the disengaged position to the engaged position, (iv) a locking mechanism may be installed, and (v) the transfer tube may be installed and fastened to the end cap.

Those of skill in the art will also appreciate that the order of steps may be varied without departing from the scope of the invention. For example, although described above with the collar being moved prior to installing the transfer tube, these steps may be completed in any order.

Advantageously, in accordance with various embodiments of the invention, an elegant engagement mechanism for an air separation module is provided. Advantageously, because the canister can be removed by itself, there is no requirement to remove an entire frame or other components from the aircraft during installation and/or replacement of canisters. Further, because the canister is removable, there is no requirement for additional, heavy frames to be installed into and removed from an aircraft in order to provide air separation process. Moreover, the air separation modules disclosed herein, and the processes for employing such modules, enables a very simple process that eliminates difficulties associated with installing and removing air separation module canisters. Additionally, because canister removal described herein may be done on a canister-by-canister basis, if multiple canisters are installed in an aircraft, there is no need to remove an entire frame (and multiple canisters) when replacing or removing only one of the canisters.

Additionally, advantageously, the installation and/or removal process enabled and described herein may be performed in a relatively short time period, thus providing additional benefits to the disclosed invention.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments and/or features.

For example, although described herein with respect to a single canister installed within an aircraft, the disclosed features may be applied to a multi-canister system. In such systems the mounting elements, rather than being integrated into the flow line features, may be provided and installed at each corner of a multi-canister pack assembly.

Further, although described and shown herein with the locking mechanism configured as a V-band coupling, those of skill in the art will appreciate that other types of locking mechanisms, couplings, connectors, and engaging mechanisms may be employed without departing from the scope of the invention.

Accordingly, the invention is not to be seen as limited by the foregoing description, but is only limited by the scope of the appended claims.

What is claimed is:

1. An air separation module for an aircraft comprising:
   a canister defining an interior chamber and having a first port at a first end and a second port at a second end, the canister configured to permit fluid to pass from the first port to the second port through the interior chamber, wherein the interior chamber is arranged to separate the fluid passing therethrough into component parts;
   a first end cap located proximal to the first end of the canister and configured to releasably retain the first end of the canister, the first end cap defining a fluid path therethrough, the first end cap mountable to a first part of the aircraft;
   a second end cap located proximal to the second end of the canister and configured to releasably retain the second end of the canister, the second end cap defining a fluid path therethrough, the first end cap mountable to a second part of the aircraft; and
   a slidable collar movably configured on the second end of the canister and configured to slide from a first position to a second position, wherein the first position defines an engagement between the slidable collar and the second end cap, and the second position defines a disengagement between the slidable collar and the second end cap such that the canister may be removed from retention between the first and second end caps, and thus removable from the aircraft.

2. The air separation module of claim 1, further comprising a transfer tube extending through and removably attached to the first end cap, the transfer tube configured to connect the fluid path of the first end cap to the interior chamber of the canister.

3. The air separation module of claim 1, further comprising a transfer tube extending through and removably attached to the second end cap, the transfer tube configured to connect the fluid path of the second end cap to the interior chamber of the canister.

4. The air separation module of claim 1, further comprising a locking mechanism configured to lock the slidable collar to the second end cap in the first position.

5. The air separation module of claim 1, wherein the first end cap and the second end cap each include one or more structural attachment points arranged to attach to the first and second parts of the aircraft, respectively.

6. The air separation module of claim 5, wherein the one or more structural attachment points comprise one or more vibration isolators.

7. The air separation module of claim 1, further comprising one or more ducting elements configured to connect at least one of the first and second end caps to an air source, wherein the air source supplies the fluid into the interior chamber of the canister.

8. The air separation module of claim 7, wherein at least one of the one or more ducting elements are configured to removably attach to a structure of the aircraft.

* * * * *